(12) United States Patent
Cannon et al.

(10) Patent No.: US 6,574,318 B1
(45) Date of Patent: Jun. 3, 2003

(54) CALL RELATED INFORMATION RECEIVER TO RECEIVER TRANSFER

(75) Inventors: Joseph M. Cannon, Harleysville, PA (US); Paul J. Davis, Wayne, PA (US); James A. Johanson, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/285,671

(22) Filed: Apr. 5, 1999

(51) Int. Cl.⁷ .......................... H04M 1/56; H04M 15/06
(52) U.S. Cl. .......................... 379/142.01; 379/142.04; 379/142.07; 379/142.13; 379/142.17; 379/142.12; 379/157; 379/211.02; 379/212.01
(58) Field of Search .................. 379/142, 201, 379/210, 211, 212, 157, 142.01, 142.04, 142.12, 142.13, 142.17, 142.18, 201.01, 201.04, 211.02, 212.01, 93.01, 93.02, 93.03, 93.23, 93.25

(56) References Cited

U.S. PATENT DOCUMENTS

| | | | | |
|---|---|---|---|---|
| 5,008,930 A | * | 4/1991 | Gawrys et al. | 379/210 |
| 5,436,962 A | * | 7/1995 | Hirata | 379/212 |
| 5,524,140 A | * | 6/1996 | Klausner et al. | 379/142 |
| 5,652,788 A | * | 7/1997 | Hara | 379/156 |
| 5,657,382 A | * | 8/1997 | Tamagawa et al. | 379/211 |
| 5,724,419 A | * | 3/1998 | Harbuziuk et al. | 379/142 |
| 5,734,706 A | * | 3/1998 | Windsor et al. | 379/142 |
| 5,737,400 A | * | 4/1998 | Bagchi et al. | 379/142.01 |
| 5,761,271 A | * | 6/1998 | Karnowski | 379/67 |
| 5,764,731 A | * | 6/1998 | Yablon | 379/88.21 |
| 5,771,281 A | * | 6/1998 | Batten, Jr. | 379/93.23 |
| 5,799,061 A | * | 8/1998 | Melcher et al. | 379/93.23 |
| 5,875,240 A | * | 2/1999 | Silverman | 379/142 |
| 5,943,397 A | * | 8/1999 | Gabin et al. | 379/67.1 |
| 5,970,128 A | * | 10/1999 | Kim | 379/142 |

(List continued on next page.)

*Primary Examiner*—Melur Ramakrishnaiah
*Assistant Examiner*—Quoc D Tran
(74) *Attorney, Agent, or Firm*—William H. Bollman

(57) ABSTRACT

A call related information detector/receiver system which is capable of downloading call related information received at that device to another call related information detector/receiver system remote from the system which initially received the call related information, back over the telephone line. Thus, a remote user while away from the home or office can receive and synchronize call related information at a system other than the one which initially received the call related information. Thus, a remote user can update a local call related information system and review past callers to their home or business telephone at their leisure. Upon establishment of a telephone call between customer premises equipment respectively associated with the two relevant call related information detector/receiver systems, a remote call related information system will request download of call related information logged from another call related information system using the established telephone call. In the disclosed embodiment, the request signals are encoded with DTMF tones, which the receiving call related information system monitors for. Upon acceptance of a request to transmit logged call related information, previously logged call related information is retrieved from its log, formatted for transmission together with suitable header information such as the identity of the transmitting call related information system, and FSK modulated for transmission back over the telephone line. Preferably, the speaker or earpiece of off-hook customer premises equipment will be muted or suppressed during transmission of the data corresponding to the call related information. The particular call related information transmitted may be particularly or generally requested by the remote call related information system, either by pre-stored commands based on a power up configuration of the requesting call related information system, and/or in response to a direct command input by the remote user using DTMF tones.

18 Claims, 4 Drawing Sheets

U.S. PATENT DOCUMENTS

| | | | | |
|---|---|---|---|---|
| 6,009,308 A | * | 12/1999 | Matsuura | 455/31.3 |
| 6,021,176 A | * | 2/2000 | McKendry et al. | 379/35 |
| 6,038,291 A | * | 3/2000 | Cannon et al. | 379/211 |
| 6,049,713 A | * | 4/2000 | Tran et al. | 455/415 |
| 6,111,939 A | * | 8/2000 | Brabanec | 379/142 |
| 6,222,913 B1 | * | 4/2001 | Cho | 379/142 |
| 6,292,549 B1 | * | 9/2001 | Lung et al. | 379/142.01 |
| 6,389,125 B1 | * | 5/2002 | Ubowski | 379/142.12 |
| 6,442,264 B1 | * | 8/2002 | Sutter | 379/142.07 |
| 6,477,546 B1 | * | 11/2002 | Velamuri et al. | 707/202 |

* cited by examiner

CALL RELATED INFORMATION RECEIVER TO RECEIVER TRANSFER

BACKGROUND OF THE INVENTION

1. Field of the Invention

This invention relates generally to a call related information system. More particularly, it relates to a call related information detector/receiver system at a customer premises equipment which is capable of synchronization or other data transfer over a telephone line with another call related information detector/receiver at another customer premises equipment.

2. Background of Related Art

Call related information services such as Calling Identity Delivery (Caller ID) allow a user to receive information identifying an incoming caller before an incoming call is answered. Typical Caller ID information includes the telephone number and/or household or business name of the calling party. Based on received Caller ID information, a user of a conventional telephone answering device equipped with a call related information detector/receiver can determine the identity of an incoming caller before answering the incoming call, or the identity of a caller who recorded a voice message on a voice messaging system equipped with a call related information detector/receiver.

Basic (i.e., Type I) call related information such as Caller ID information is transmitted from a local telephone company to the desired called party while the called party's telephone is in a hung-up or on-hook state, e.g., between the first and second rings.

Advanced call related information services (i.e., Type II) allow a user to receive call related information regarding an incoming caller while their telephone is in use, i.e., in an off-hook condition. For instance, with Caller ID Call Waiting (CIDCW) service, the called party can receive Caller ID information (e.g., a telephone number and/or household or business name) regarding an incoming call from a third party while the called party's telephone is already in an established telephone call with another party on the same telephone line.

An example of a call related information detector/receiver system is shown in FIG. 4.

In particular, FIG. 4 shows a relevant portion of a conventional telephone device 11 including a call related information detector/receiver 25. The call related information detector/receiver detects and receives call related information, e.g., the telephone number and/or household or business name, regarding a calling party. The currently received call related information is displayed by a controller 190 on a display 27.

Received call related information is stored in a call related information log 500. Typically, the call related information log is formed in non-volatile memory such as Flash memory accessible by the controller 190 and/or the call related information detector/receiver 25. The call related information log 500 is typically of limited length, and thus maintains a log of the latest received call related information, the oldest logged call related information being replaced with the newest. To view the logged call related information, a user typically activates up or down scrolling keys 502, and the controller 190 retrieves the previous or next entry of call related information in the call related information log 500, and displays the same on the display 27.

Currently, in order to access logged call related information, it must be viewed directly on a local display 27.

Moreover, because the display 27 is local to the customer premises equipment which initially received the call related information, the user must be in close or near proximity to that equipment to view the call related information. However, in some instances, it may be desirable for the user to retrieve the logged call related information at a location remote from the telephone answering device, e.g., through the public switched telephone network (PSTN). Unfortunately, conventional call related information detector/receiver devices require the user to return to the device which initially received the call related information.

This is particularly the case to review information contained in a large number of the entries in the call related information log 500 of a particular customer premises equipment device. However, in today's mobile environment, a user may not always be local to their telephone receiving calls for them, and therefore may not be able to utilize logged call related information when required. Moreover, if away from their telephone for an extended period of time, the oldest call related information entries may be forever lost without the user having the opportunity to review the oldest entries, particularly if the call related information log 500 has a small capacity.

Accordingly, there exists a need for an improved technique and apparatus which allows a user to remotely retrieve call related information received by another customer premises equipment.

SUMMARY OF THE INVENTION

In accordance with the principles of the present invention, a call related information remote access module comprises a call related information detector/receiver module adapted to detect and receive call related information regarding a calling party over a telephone line from a central office. A data synchronization module is adapted to transmit logged call related information detected and received by the call related information detector/receiver module back to another call related information detector/receiver module.

A method of transferring call related information from one customer premises equipment to another customer premises equipment over a telephone line in accordance with another aspect of the present invention comprises establishing a telephone call between a first call related information detector/receiver system and a second call related information detector/receiver system. Previously received call related information logged at the first call related information detector/receiver system is transmitted to the second call related information detector/receiver system through the telephone call.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a call related information detector/receiver system which is capable of downloading data corresponding to call related information received at that device to another call related information detector/receiver system, back over the telephone line. Thus, a remote user can synchronize received call related information (e.g., Caller ID information) with their usual call related information detector/receiver system back at their home or office, and review the call related information (e.g., using a display at their remote location) at their leisure.

Figure 1:
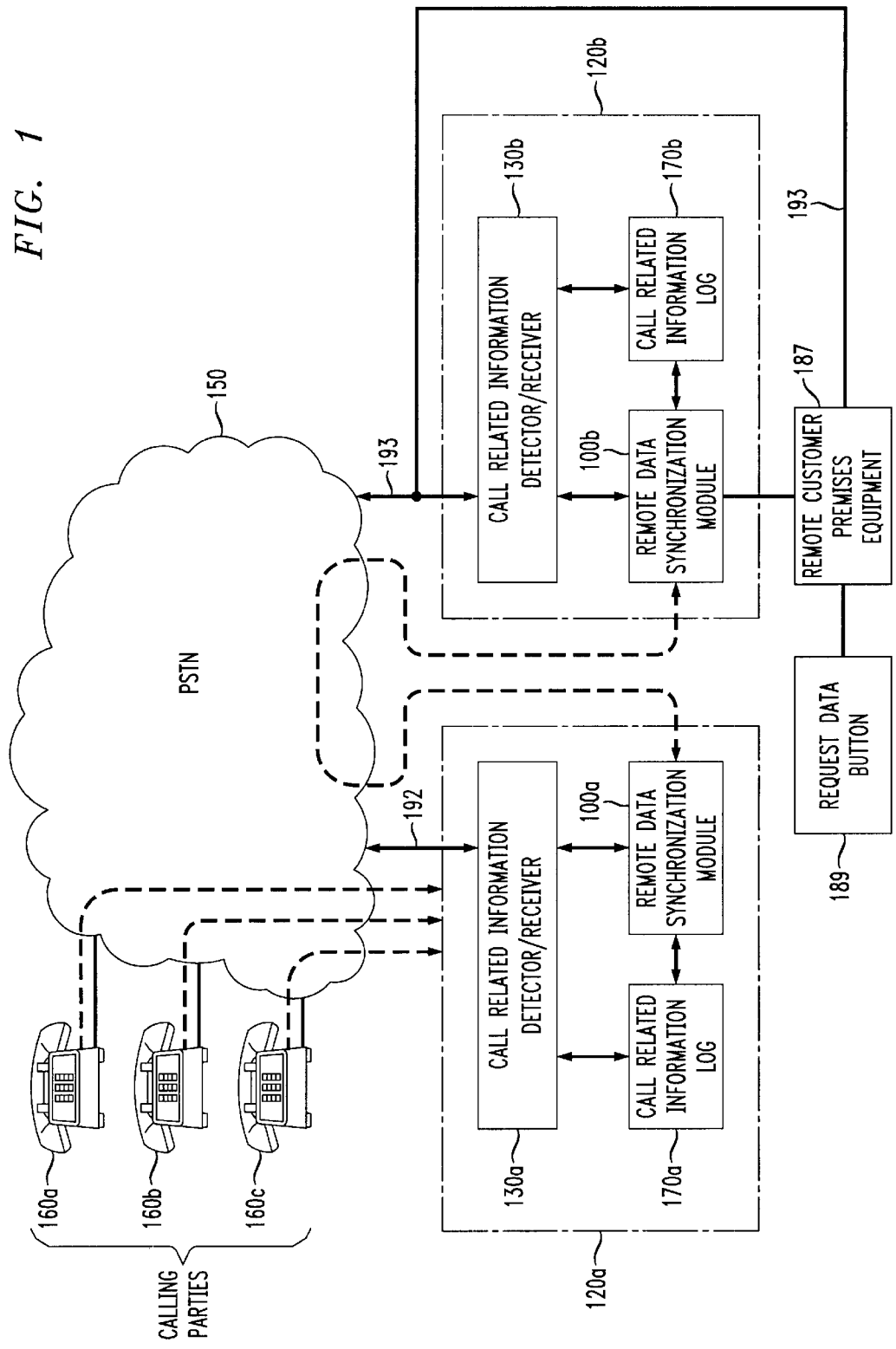
FIG. 1 illustrates the reception of call related information regarding a plurality of callers by a first call related information detector/receiver system, and the transfer of data and/or synchronization of data back over the public switched telephone network (PSTN) using a telephone line from the first call related information detector/receiver system which initially received the call related information from a central office, and a remote call related information detector/receiver system, in accordance with the principles of the present invention.

FIG. 1 illustrates the reception of call related information regarding a plurality of callers by a first call related information detector/receiver system, and the transfer of data and/or synchronization of data back over the public switched telephone network (PSTN) using a telephone line from the first call related information detector/receiver system which initially received the call related information from a central office, and a remote call related information detector/receiver system, in accordance with the principles of the present invention.

In particular, a first call related information detector/receiver system 120a and a second call related information detector/receiver system 120b, each constructed in accordance with the principles of the present invention, are serviced by respective telephone lines 192, 193 from the public switched telephone network (PSTN). Each of the call related information detector/receiver systems 120a, 120b (collectively referred to herein as 120) include an otherwise conventional call related information detector/receiver 130a, 130b, respectively.

The call related information detector/receiver systems 120a, 120b further include respective call related information logs 170a, 170b. The call related information logs 170a, 170b are preferably formed in non-volatile memory, e.g., Flash memory, but may be formed in volatile memory such as conventional random access memory (RAM). Preferably, the call related information logs 170a, 170b are of sufficient length for the particular application, but may allow overwriting of the oldest entries with call related information regarding the newest entries (either newest with respect to when the original telephone call was made, or newest with respect to when the call related information was transferred to the relevant call related information detector/receiver system).

The entries in the call related information logs 170a, 170b may be arranged in any suitable order. For instance the entries may be arranged chronologically, e.g., with respect to when the telephone call from the relevant calling party was made, or with respect to when the data was transferred to the relevant call related information detector/receiver system.

In accordance with the principles of the present invention, the call related information logs 170a, 170b store entries including conventional call related information such as telephone numbers and/or household or business names of calling parties. However, each of the entries preferably also includes an identification (e.g., telephone number) of the original receiver of the information if other than the displaying system. For instance, call related information initially received by another call related information detector/receiver system but transferred to the relevant call related information detector/receiver system may include a parameter in the entry (e.g., a telephone number and/or household name) which identifies the transmitting call related information detector/receiver, while entries initially received by the relevant call related information detector/receiver may be left without such information. Preferably, the display of the relevant call related information detector/receiver system includes display of the identity of the originating system.

The call related information detector/receiver systems 120a, 120b include respective remote data synchronization modules 100a, 100b to coordinate transmission and reception of data between the two call related information detector/receiver systems 120a, 120b. The remote data synchronization modules 100a, 100b are preferably software modules within a suitable processor, e.g., a microprocessor, a microcontroller, or a digital signal processor (DSP).

FIG. 1 depicts (with dotted lines) passage of data corresponding to call related information initially from three calling parties 160a–160c to the first call related information detector/receiver system 120a in a conventional fashion, and then from the first call related information detector/receiver system 120a to the second call related information detector/receiver system 120b back over the telephone line using a telephone call established by remote customer premises equipment 187 associated with the second call related information detector/receiver system 120b.

Preferably, the remote customer premises equipment (e.g., a common telephone) 187 includes a request data button 189 (or sequence of keys) which, when activated by the remote user, initiates a request for the transfer of data corresponding to call related information from a remote call related information detector/receiver system 120a through the remote data synchronization module 100b of the requesting call related information detector/receiver system 120b.

Figure 2:
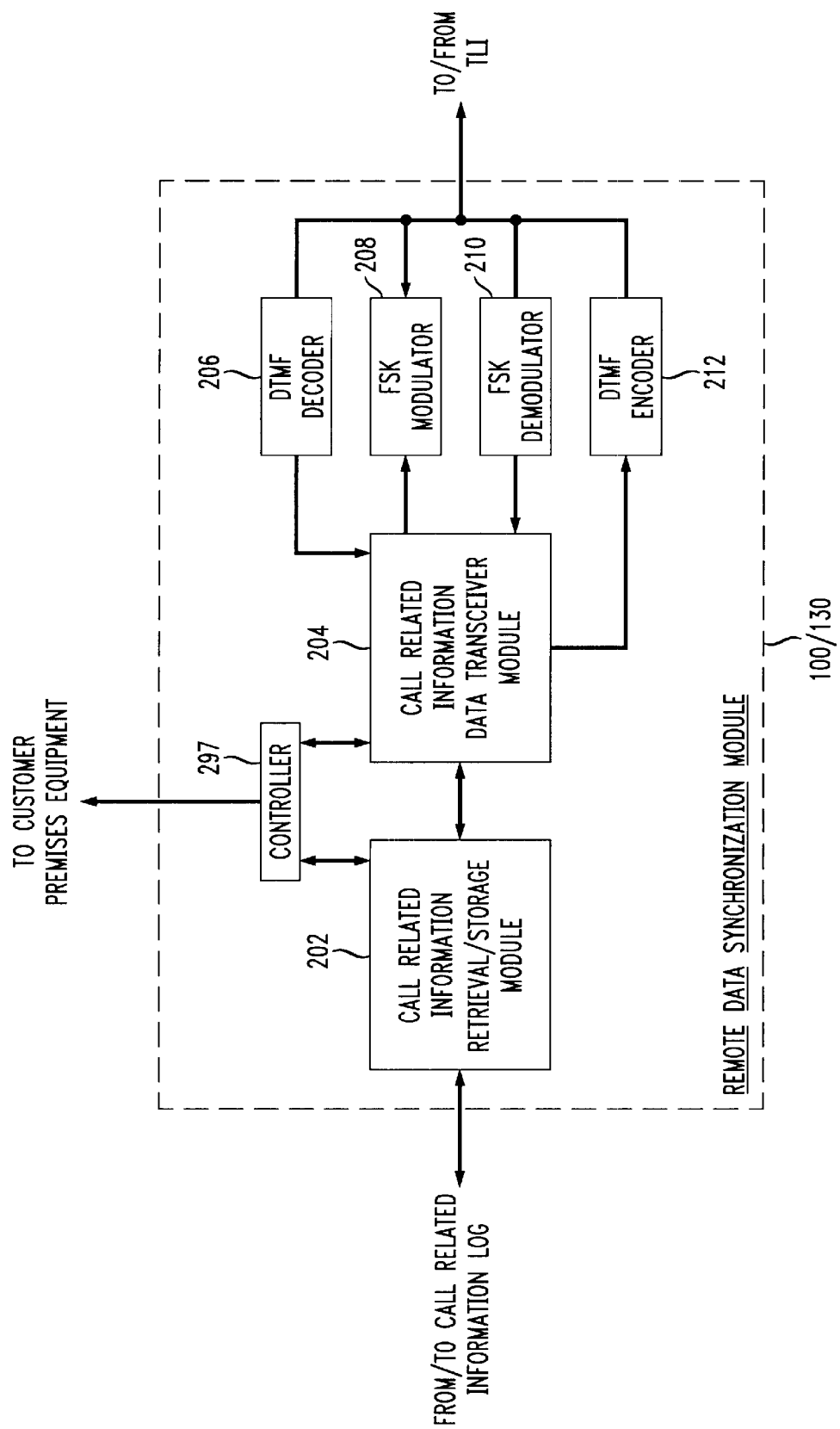
FIG. 2 is a detailed block diagram of an exemplary embodiment of the remote data synchronization module shown in FIG. 1.

FIG. 2 is a detailed block diagram of an exemplary embodiment of the remote data synchronization module 100a, 100b (collectively referred to herein as 100) shown in FIG. 1, in accordance with the principles of the present invention.

In particular, the remote data synchronization module 100 includes a call related information retrieval/storage module 202, and a call related information data transceiver module 204. The remote data synchronization module 100 preferably operates in both a transmitting direction and in a receiving direction. In a transmitting direction, call related information stored in them relevant call related information log 170 is retrieved and transmitted to a remote, requesting call related information detector/receiver system. In a receiving direction, call related information is received from a remote call related information detector/receiver system and stored in a local call related information log. Aspects of the call related information retrieval/storage module 202 and the call related information data transfer module 204 (e.g., whether in a transmit or receive mode) are controlled by an appropriate controller 297.

The controller 297 may be any suitable processor, e.g., a microcontroller, a microprocessor, or a digital signal processor. Also, the controller 297 may interface directly to the relevant customer premises equipment 187 (FIG. 1).

The remote data synchronization module 100 as shown in FIG. 2 includes transmitter and receiver components of the call related information detector/receiver 130, e.g., a frequency shift keying (FSK) modulator 208 and an FSK demodulator 210. FSK communications are used in conventional Caller ID and other call related information transfer techniques, and are preferably used for data transfer between separate call related information detector/receiver systems back over a telephone line.

ADSL or other suitable communication technique may alternatively be utilized for transfer of call related information in accordance with the principles of the present invention. ADSL is an inband data transmission technique which allows the transmission of data on a telephone line using frequencies outside the audible range.

The remote data synchronization module 100 further includes a dual tone, multiple frequency (DTMF) decoder 206 and a DTMF encoder 212, enabling DTMF communications over the telephone line through the relevant telephone line interface (TLI). Preferably, a remote call related information detector/receiver system will initially request transmission of call related information from another call related information detector/receiver system using a command encoded with DTMF tones. The receiving call related information detector/receiver system will continually monitor the telephone line, or will monitor the telephone line at a prearranged time (e.g., during the first minute of a telephone call), for reception of a predetermined DTMF code requesting call related information from the receiving call related information detector/receiver system.

All or only portions of the call related information stored in a particular call related information log may be requested for transfer to a remote call related information detector/receiver system. For instance, separate request buttons or parameters may be established for requesting transfer of only the last, of the last ten (10), the last twenty-five (25), or all entries stored in the remote call related information log, and the transmitted DTMF code may relay these separate parameters to the relevant call related information detector/receiver system.

For instance, one particular DTMF encoded command comprising a sequence of one or more alphanumeric key presses at the remote telephone may correspond to a request to transfer data corresponding to all "new" call related information received, e.g., since the last data transfer, or for all call related information currently stored in the call related information log. Similarly, for ease of use and added flexibility, additional commands may be implemented in the controller 297 for interpreting requests from the remote telephone to increment or decrement by one or more entries in the call related information storage area.

All components shown in FIG. 2 may be integral to the controller 297, or may be separate therefrom.

The call related information retrieval module 202 accesses entries in the call related information log 170 of the relevant call related information detector/receiver system 120, while the call related information data transceiver module 204 formats the accessed call related information with appropriate header information for transmission to the requesting call related information detector/receiver system. The header information may include, e.g., CRC or other error check codes, as well as the identity of the transmitting call related information detector/receiver system. The call related information may be transmitted in ASCII or other suitable data form.

Figure 3:
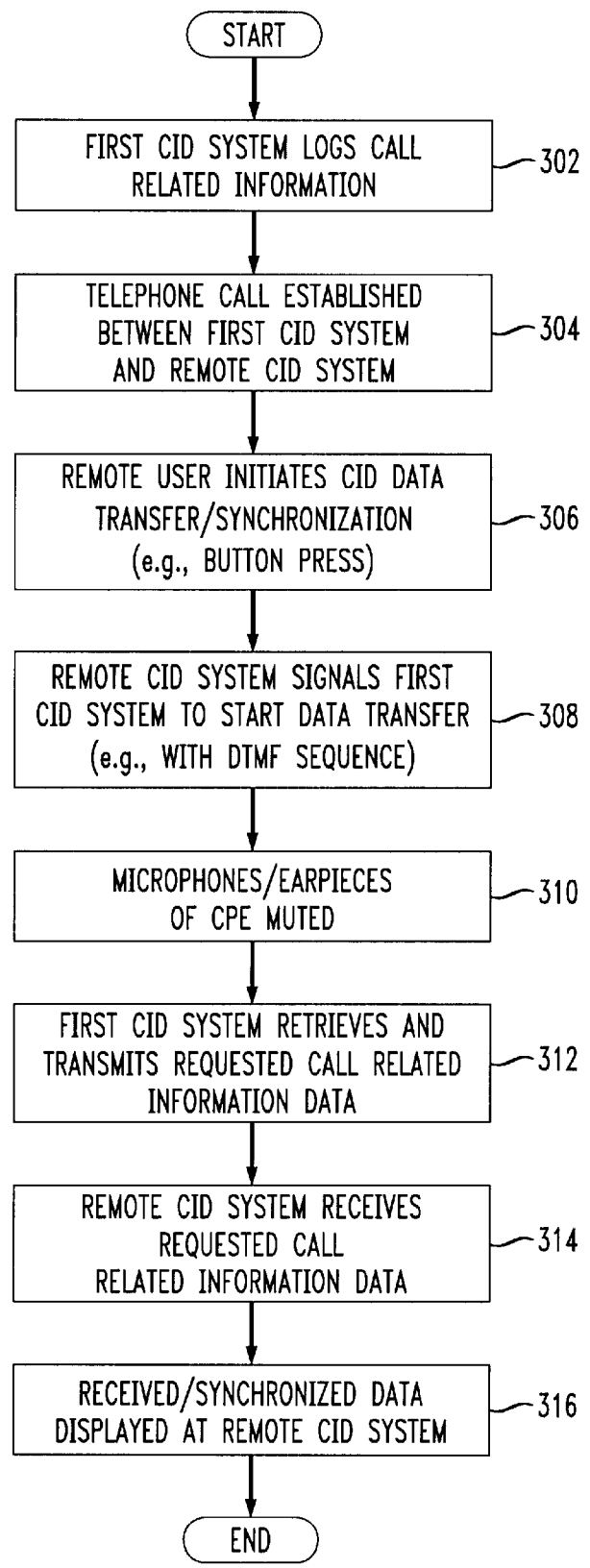
FIG. 3 is a flow chart showing an exemplary process by which a first call related information system initially receives from a central office call related information from one or more calling parties, and by which a remote call related information detector/receiver system requests and receives call related information initially received, logged, and transmitted by the first call related information system back over the PSTN, in accordance with the principles of the present invention.
Figure 4:
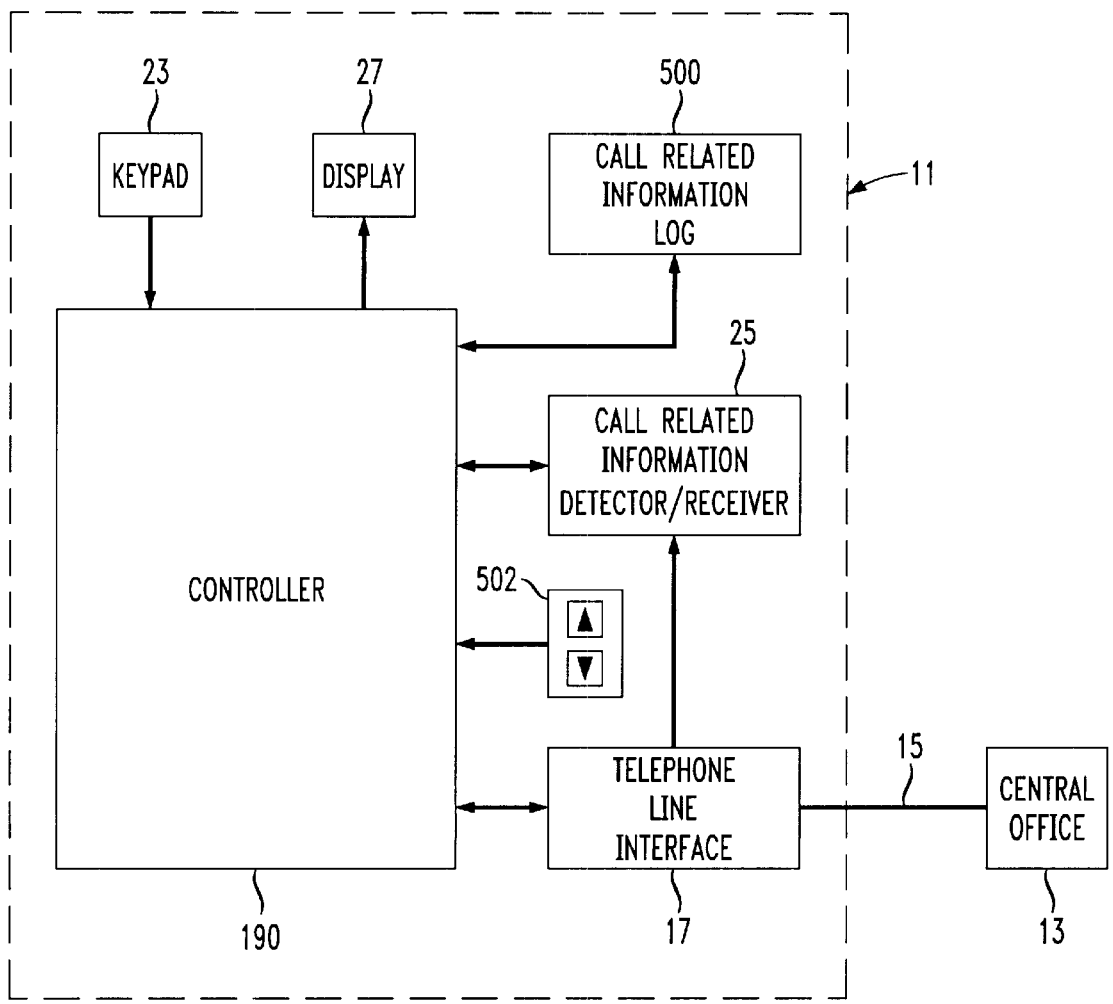
FIG. 4 illustrates a relevant portion of a conventional call related information detector/receiver system.

FIG. 3 shows an exemplary process by which call related information is initially received and logged in a first call related information (e.g., Caller ID (CID)) detector/receiver system, and transferred in data form to another CID system back over the telephone line, in accordance with the principles of the present invention.

In particular, in step 302, a first CID system receives one or more incoming telephone calls and logs the respective call related information into the relevant local call related information log.

In step 304, a telephone call is established between the first CID system and a remote CID system using remote customer premises equipment associated with the same telephone line as the remote CID system.

In step 306, the remote user initiates or requests a transfer and/or synchronization of call related information (e.g., Caller ID information data) between the remote CID system and the first CID system, e.g., by activating a particular button or sequence of buttons on the customer premises equipment associated with the same telephone line as the remote CID system. (It is also possible to automatically request call related information data transfer, e.g., at the beginning of each telephone call to a particular telephone number known by the remote customer premises equipment as being that from which call related information data is to be synchronized.)

In step 308, the remote CID system signals the first CID system to start the call related information data transfer, e.g., using a DTMF encoded command over the telephone line.

In step 310, the microphone/earpiece of the customer premises equipment at the remote and/or called end are muted or otherwise suppressed from audibly hearing the subsequent FSK signaling occurring over the telephone line. While not necessary, muting will avoid the uncomfortable noise heard by the user(s) during FSK data transfer.

In step 312, the first CID system retrieves and transmits the requested call related information data to the requesting remote CID system.

In step 314, the remote CID system receives the requested call related information data from the first CID system.

In step 316, the call related information received by the remote CID system is displayed at the remote users convenience at a display local to the remote CID system. For instance, the call related information may be displayed as it is received, e.g., refreshed once per second, and can be scrolled up/down after it is received.

While the invention has been described with reference to the exemplary embodiments thereof, those skilled in the art will be able to make various modifications to the described embodiments of the invention without departing from the true spirit and scope of the invention.

What is claimed is:

1. A Caller ID information remote access module, comprising:
    a first Caller ID information detector/receiver module in customer premises equipment adapted to detect and receive Caller ID information regarding a calling party over a telephone line from a central office;
    a second Caller ID information receiver module in a device remote from said customer premises equipment through a public network; and
    a data synchronization module in said second Caller ID information receiver module remote from said customer premises equipment, said data synchronization module being adapted to receive via said public network a plurality of previously logged Caller ID information detected and received by said first Caller ID information detector/receiver module relating to a plurality of previous calling parties.

2. The Caller ID information remote access module according to claim 1, wherein:
said logged Caller ID information is transmitted in ASCII form.

3. The Caller ID information remote access module according to claim 1, wherein:
said plurality of previously logged Caller ID information is transmitted back over said public network using an FSK technique.

4. The Caller ID information remote access module according to claim 1, wherein said data synchronization module comprises:
an FSK modulator and demodulator.

5. The Caller ID information remote access module according to claim 4, wherein said data synchronization module further comprises:
a DTMF decoder.

6. A method of transferring Caller ID information from customer premises equipment to a telephone device remote via a public network, said method comprising:
establishing a telephone call between a first Caller ID information detector/receiver in customer premises equipment and a second Caller ID information detector/receiver in a device remote from said first Caller ID information detector/receiver via a public network; and
synchronizing a plurality of previously received Caller ID information relating to a plurality of previous calling parties logged at said first Caller ID information detector/receiver in customer premises equipment with said device remote from said first Caller ID information detector/receiver in customer premises equipment over said public network.

7. The method of transferring Caller ID information from customer premises equipment to a telephone device remote via a public network according to claim 6, said method further comprising:
accepting a request, through a telephone call over said public network, for transfer of Caller ID information logged at said first Caller ID information detector/receiver in customer premises equipment from said remote telephone device.

8. The method of transferring Caller ID information from customer premises equipment to a telephone device remote via a public network according to claim 7, wherein:
said request is transmitted using DTMF tones.

9. The method of transferring Caller ID information from customer premises equipment to a telephone device remote via a public network according to claim 7, wherein:
said request relates to synchronization of Caller ID information relating to a plurality of telephone calls received by said first Caller ID information detector/receiver.

10. The method of transferring Caller ID information from customer premises equipment to a telephone device remote via a public network according to claim 7, wherein said step of transmitting comprises:
FSK modulating said logged Caller ID information for transmission.

11. Apparatus for transferring Caller ID information from one customer premises equipment to another customer premises equipment over a public network, comprising:
means for establishing a telephone call over a public network between a first Caller ID information detector/receiver system and a second Caller ID information detector/receiver system; and
means for synchronizing a plurality of previously received Caller ID information relating to a plurality of previous calling parties logged at said first Caller ID information detector/receiver system with said second Caller ID information detector/receiver system through said telephone call over said public network.

12. The apparatus for transferring Caller ID information from one customer premises equipment to another customer premises equipment over a public network according to claim 11, further comprising:
means for accepting a request, through said telephone call, for transfer of Caller ID information logged at said first Caller ID information detector/receiver from said second Caller ID information detector/receiver.

13. The apparatus for transferring Caller ID information from one customer premises equipment to another customer premises equipment over a public network according to claim 12, wherein:
said request acceptable by said means for accepting said request is transmitted using DTMF tones.

14. The apparatus for transferring Caller ID information from one customer premises equipment to another customer premises equipment over a public network according to claim 12, wherein:
said request acceptable by said means for accepting said request relates to synchronization of Caller ID information relating to a plurality of telephone calls received by said first Caller ID information detector/receiver.

15. The apparatus for transferring Caller ID information from one customer premises equipment to another customer premises equipment over a public network according to claim 12 wherein said means for transmitting comprises:
means for FSK modulating said logged Caller ID information for transmission.

16. The Caller ID information remote access module according to claim 1, wherein said public network comprises:
a Public Switched Telephone Network (PSTN).

17. The method of transferring Caller ID information from customer premises equipment to a telephone device remote via a public network according to claim 6, wherein said public network comprises:
a Public Switched Telephone Network (PSTN).

18. The apparatus for transferring Caller ID information from one customer premises equipment to another customer premises equipment over a public network according to claim 11, wherein said public network comprises:
a Public Switched Telephone Network (PSTN).

* * * * *